US009189533B2

(12) United States Patent
Wautier et al.

(10) Patent No.: US 9,189,533 B2
(45) Date of Patent: Nov. 17, 2015

(54) SYNC FRAMEWORK EXTENSIBILITY (71) Applicant: Microsoft

(72) Inventors: Marc Wautier, Seattle, WA (US);
Daniel Fiordalis, Seattle, WA (US);
Miko Arnab S. Bose, Seattle, WA (US);
Scott Hoogerwerf, Seattle, WA (US);
Oded Shekel, Bellevue, WA (US);
Simon Clarke, Seattle, WA (US); Chris Guzak, Kirkland, WA (US); Balaji Balasubramanyan, Redmond, WA (US); Michael Novak, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 145 days.

(21) Appl. No.: 13/904,979

(22) Filed: May 29, 2013

(65) Prior Publication Data

US 2014/0358860 A1    Dec. 4, 2014

(51) Int. Cl.
G06F 17/30 (2006.01)
G06F 7/00 (2006.01)

(52) U.S. Cl.
CPC .... *G06F 17/30575* (2013.01); *G06F 17/30115* (2013.01); *G06F 17/30174* (2013.01); *G06F 17/30194* (2013.01)

(58) Field of Classification Search
USPC ........................................................ 707/638
See application file for complete search history.

(56) References Cited

U.S. PATENT DOCUMENTS

| 8,255,731 | B1 | 8/2012 | Alsina et al. | |
|---|---|---|---|---|
| 2004/0049513 | A1 | 3/2004 | Yakir et al. | |
| 2005/0198385 | A1 | 9/2005 | Aust et al. | |
| 2008/0010325 | A1 | 1/2008 | Yamakawa | |
| 2008/0250213 | A1* | 10/2008 | Holt .............................. | 711/159 |
| 2009/0125566 | A1 | 5/2009 | Kuo | |
| 2010/0325098 | A1 | 12/2010 | Ringseth et al. | |
| 2011/0035355 | A1 | 2/2011 | Sagar et al. | |
| 2011/0137879 | A1 | 6/2011 | Dubey | |

(Continued)

FOREIGN PATENT DOCUMENTS

WO    2008/095237 A1    8/2008

OTHER PUBLICATIONS

"Custom Provider Fundamentals", Retrieved at <<http://msdn.microsoft.com/en-us/library/bb902844(v=sql.105).aspx>>, Retrieved Date: Mar. 21, 2013, pp. 9.

(Continued)

*Primary Examiner* — Kuen Lu
(74) *Attorney, Agent, or Firm* — Bryan Webster; Judy Yee; Micky Minhas (57) ABSTRACT Embodiments described herein may involve enabling applications to cooperate with a system-level sync framework. The sync framework may provide system synchronization of files between user devices and a cloud storage service. Arbitrary applications on a user computing device can communicate with the sync framework to temporarily suspend synchronization of a specified file by the sync framework. The application can register functions with the sync framework that the sync framework can invoke in relation to suspending synchronization, continuing to provide system-level access to the file for arbitrary applications, and resuming synchronization.

20 Claims, 6 Drawing Sheets (56) References Cited

U.S. PATENT DOCUMENTS

| | | | |
|---|---|---|---|
| 2011/0151837 A1* | 6/2011 | Winbush, III | 455/412.1 |
| 2011/0302327 A1 | 12/2011 | Prophete et al. | |
| 2012/0023107 A1 | 1/2012 | Nachnani et al. | |
| 2012/0215820 A1 | 8/2012 | Ogasawara et al. | |
| 2013/0104251 A1* | 4/2013 | Moore et al. | 726/30 |
| 2013/0226872 A1* | 8/2013 | Barefoot et al. | 707/638 |
| 2014/0188803 A1* | 7/2014 | James et al. | 707/638 |

OTHER PUBLICATIONS

"SyncToy 2.1", Retrieved at << http://www.microsoft.com/en-in/download/details.aspx?id=15155>>, Nov. 24, 2009, pp. 3.

Helm, Rob, "SharePoint 2010 Evaluation Guide", Retrieved at <<http://www.savvisdirect.com/sites/default/files/SharePoint2010EvaluationGuide_Comprehensive_0.pdf>>, Jul. 19, 2010, pp. 75.

Hatch, Martin, "SkyDrive and SkyDrive Pro Explained (Office 2013 and SharePoint 2013)", Retrieved at <<http://www.martinhatch.com/2013/02/skydrive-and-skydrive-pro-explained.html>>, Feb. 2013, pp. 5.

PCT/US2013/061073, International PCT Search Report and Written Opinion, Europeaon Patent Office, Nov. 7, 2013, 7 pages.

"International Search Report & Written Opinion for PCT Patent Application No. PCT/US2013/061071", Mailed Date: Jan. 2, 2014, Filed Date: Sep. 21, 2013, 10 pages.

* cited by examiner

SYNC FRAMEWORK EXTENSIBILITY

BACKGROUND

In the field of network or cloud computing, services have been developed to provide cloud storage for use by client computers connecting to the cloud. While cloud storage has been implemented in many ways, recently, cloud storage has become closely integrated with the file systems (and operating systems) of client computers. From a user's perspective, it has been desirable to provide a cloud file that appears to have universal or floating presence in the cloud as well as on a user's client computing devices that connect to the cloud. A goal has been to allow a file that is stored in the cloud to be read and written by a user's devices connecting to the cloud as well as perhaps software within the cloud. A single file entity (from the user's perspective) might in fact have multiple copies or versions on the cloud and the client computers that are being updated in parallel. To maintain coherency for the file, i.e., to keep the file content consistent across the cloud and across the user devices that connect to the cloud, a file synchronization system, or sync engine, may be employed.

To provide a smooth user experience and transparent coherency, this synchronization of a cloud-based file is preferably performed at the file system and/or operating system level. This hides the housekeeping work that is usually required to maintain synchronization between instances of what are supposed to be the same logical file. This system-managed synchronization also relieves programmers of the burden of having to code their own custom synchronization software.

Nonetheless, there may be times when an application or other software outside the sync engine and client operating system needs to perform custom synchronization or otherwise manage and coordinate the cloud and client based instances of a file. For example, collaborative concurrent editing for a word processor might involve synchronization issues that a system-provided sync engine cannot address. In addition, operating system level or file system level sync engines have not been able to share sync-related responsibilities with arbitrary applications. If an application has needed to use a cloud-shared file in a way that might conflict with or interfere with the sync engine, the only choice would be for the application to assume total responsibility for the file from the sync engine.

Discussed below are techniques for, among other things, allowing a sync engine to temporarily relinquish synchronization of a file and to make use of sync-related functionality provided by applications.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments described herein may involve enabling applications to cooperate with a system-level sync framework. The sync framework may provide system synchronization of files between user devices and a cloud storage service. Arbitrary applications on a user computing device can communicate with the sync framework to temporarily suspend synchronization of a specified file by the sync framework. The application can register functions with the sync framework that the sync framework can invoke in relation to suspending synchronization, continuing to provide system-level access to the file for arbitrary applications, and resuming synchronization.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to providing extensibility to a sync engine to allow applications to temporarily lock-out the sync engine from a file, i.e., to exclude the file from the synchronization oversight of the sync engine. Embodiments also relate to allowing applications to register functionality with the sync engine that the sync engine can invoke to, for example, help resolve sync problems or provide data from a file that is not being synchronized.

The description below will begin with an overview of cloud-based file storage shared by multiple devices. A sync framework and potential conflicts between sync engines and applications will be described next, followed by explanation of extensibilities that can be built into sync engines to allow synchronization locking and sync engine use of application functionality that might help the sync engine perform synchronization and provide access to files that are temporarily not being synchronized.

Figure 1:
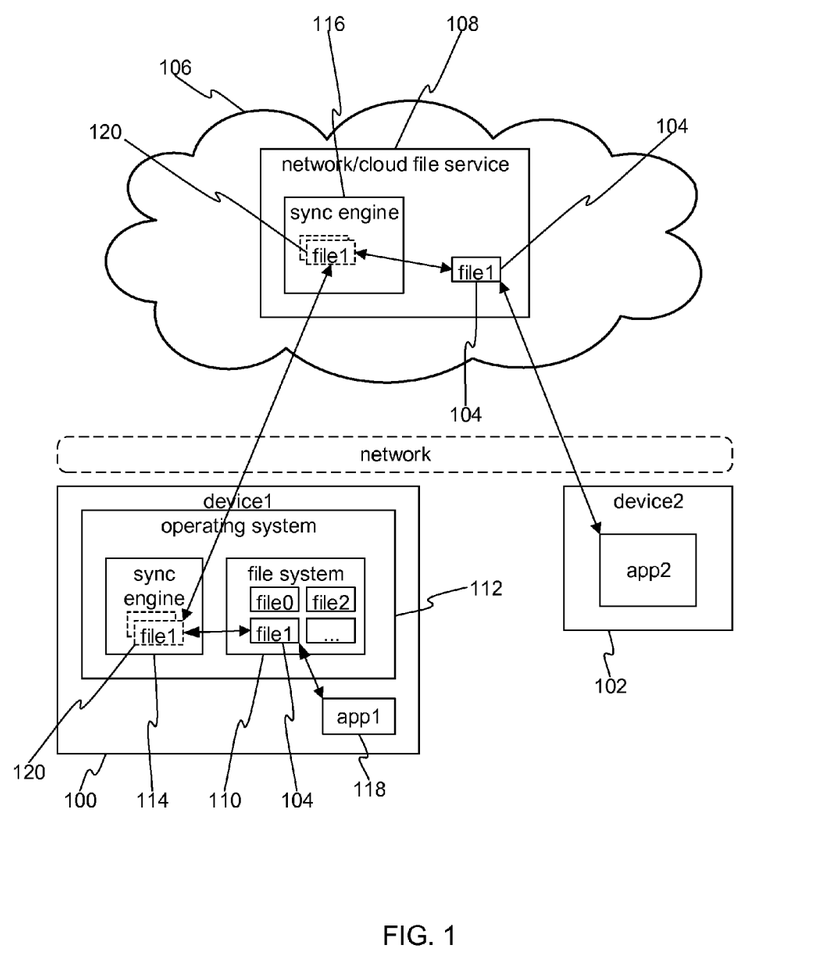
FIG. 1 shows a user's computing devices sharing a file that is stored across at a cloud.

FIG. 1 shows a user's computing devices 100, 102 sharing a file 104 that is stored across at least a cloud 106 and user computing device 102. The cloud 106 may have a variety of services not all shown in FIG. 1. The cloud 106 may have an account service that manages user accounts or user credentials. The account service may provide a credential for each user. A user might use his or her credential to access the cloud 106 and various services therein such as a search engine, an email service, a virtual machine or application hosting service, a storage or file service 108, or others. Such cloud services might be accessed using a web browser or other client software on a user's computing device such as computing device 100. A given user might link multiple of their computing devices at the cloud 106 using the same account or credential. In the example of FIG. 1, a user has linked both computing device 100 (device1) and computing device 102 (device2) with the cloud file service 108, thus enabling seamless sharing of the file 104.

In some cases, client software might access a cloud service transparently, provided authorization has been obtained from the cloud 106 per the user's credential. For example, the user computing device 100 might have a file explorer, system browser, or other user interface for exploring a local file system 110, which is controlled by an operating system 112. Such client-side software might also connect with the file service 108 and allow exploring of files on the file service 108 as though they were part of the local file system 110. Client-side software can also be arbitrary applications executing on the user computing devices 100, 102, or elsewhere.

Some cloud services allow a file or a file store to be simultaneously stored and accessed on multiple user devices and the cloud 106. For example, referring to FIG. 1, a file such as the file 104 ("file1") may be locally stored in the file system 110 of the user computing device 100. The file 104 might also be stored in the cloud's file service 108. The copy of the file 104 at the file service 108 might also be provided by the file service 108 to other applications on other of the user's devices such as user computing device 102. Because multiple entities are accessing and potentially writing to the file 104, a sync framework is employed to synchronize the instances or copies of the file 104.

The sync framework may include cooperating sync engines, such as a sync engine 114 on the user computing device 100 and a sync engine 116 on the cloud 106 (which might lie behind the file service 108). Each sync engine performs local steps to keep a corresponding local copy of the file 104 in sync with the other copies of the file 104 (note that the file 104 represents any arbitrary file). In general, this involves a sync engine receiving or detecting local updates to its local version of the file 104 and propagating those updates to another of the sync engines, which in turn updates its local copy of the file 104 so that the copies of the file 104 are in sync.

In one embodiment, the file service 108 may act as a central storage and coordinator so that the user's devices might not synchronize directly with each other. For example, the user computing device 102 might exchange sync updates with the cloud 106, and the user computing device 100 might similarly exchange updates with the cloud 106. However, the computing device 100 and the computing device 102 synchronize with each other indirectly through the intermediating sync engine 116 at the file service 108, which in effect propagates one user device's updates through to the other. The specific algorithms of a sync engine may vary according to whether it is at the cloud 106 or at a user device.

In addition to the basic synchronization logic mentioned above, the sync engines 114, 116 might also have logic to deal with intermittent losses of network connectivity between the cloud 106 and the user device 100. For example, when connectivity is not available between the user device 100 and the cloud 106, app1 118 on the user device 100 might write edits or updates to its local file 104. Updates during a disconnect must accumulate at both locations until connectivity is reestablished. When connectivity is reestablished, the sync engines 114, 116 may cooperate to attempt to reconcile their accumulated updates (the copy of the file 104 in the cloud 106 might also have been receiving updates, perhaps from user device 102 that is still connected to the cloud 106). When the instances of the file 104 cannot be reconciled, local versions 120 and even subversions might be created and saved. Divergent versions 120 not reconcilable by the sync framework might eventually require the user's intervention.

Figure 2:
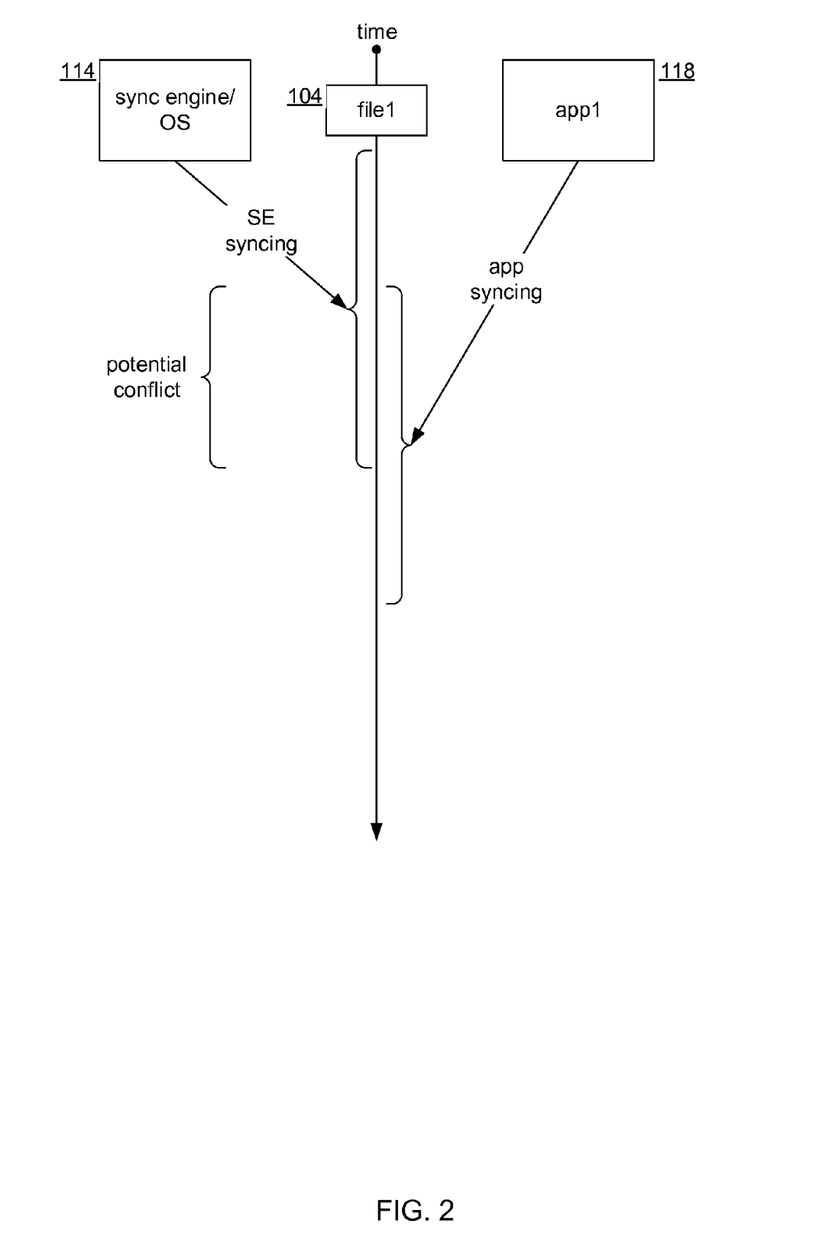
FIG. 2 shows an example scenario where file syncing can be problematic.

FIG. 2 shows an example scenario where file syncing can be problematic. In this example, app1 118 (representing any arbitrary application) is assumed to have access to both the local instance of the file 104 on the user computing device 100 as well as access to the copy or instance at the cloud 106, possibly after obtaining from the operating system 112 a Uniform Resource Locator (URL) or other network file handle for the cloud based file 104. Initially, the sync engine 114 is syncing the file 104 with the cloud 106, as discussed above. During that time, app1 118 begins accessing and writing both the local copy of the file 104 as well as the copy at the cloud file service 108. Such parallel use of the file 104 may eventually cause conflicts or interference, potentially corrupting the file 104 or disrupting operation of the sync framework or app1 118.

Figure 3:
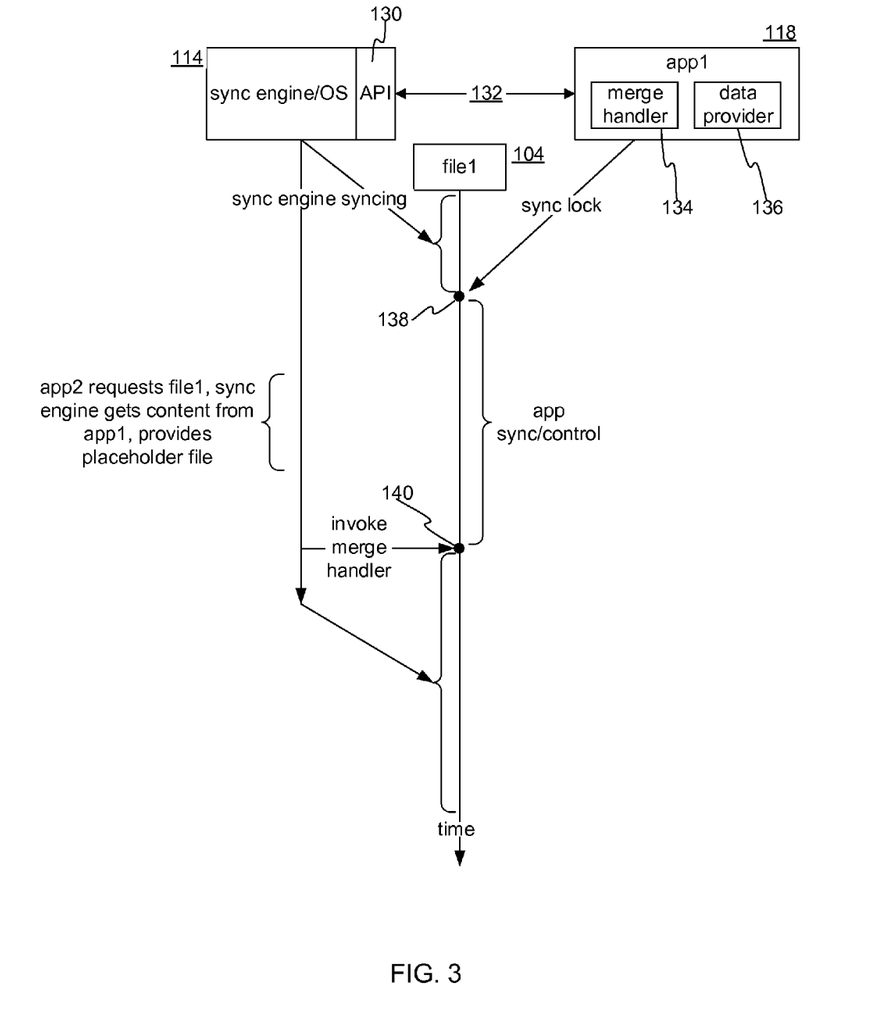
FIG. 3 shows a sync engine with an extension application programming interface (API) for coordinating file-handling activities with any suitably coded software.

FIG. 3 shows the sync engine 114 with an extension application programming interface (API) 130 for coordinating file-handling activities with any suitably coded software (represented by app1 118) running on the user device 100. An API is only one example of how the sync engine 114 can communicate or exchange calls/replies 132 or messages with applications. Other programming techniques such as software interfaces and contracts may be used. In addition, while communication with the sync engine 114 is discussed, the API 130 may be surfaced as part of the overall sync framework.

The API 130 may include a variety of calls, methods, etc., invocable by arbitrary applications such as app1 118. One such call may be a sync-lock call, which can also specify or be directed to a file, such as file 104. When the call is invoked, say for file 104 by app1 118, the sync-engine 114 proceeds to stop syncing the file 104 with the cloud 106. This may involve various preparatory measures such as applying any outstanding updates to the file 104, communicating with the sync engine 116 at the cloud 106 to indicate that the sync framework is perhaps temporarily relinquishing sync responsibility for the file 104. The sync engine 116 may in turn apply updates or perform other tasks such as instructing the cloud file service 108 to flush bits to disk. The sync engine 114 may reply to the sync-lock call according to its state. For instance, if the local file 104 is unable to be reconciled, perhaps due to loss of network connectivity with the cloud 106, the sync engine 114 might reply to app1 118 accordingly. If a fork (new subrevision) of the local file 104 is performed, app1 118 might also be informed. In one embodiment, app1 118 first opens the local file 104 and/or the cloud-based instance of the file 104 in a read-only mode, and when the sync-lock call returns successfully the app1 118 then opens the file 104 in a write mode. Note that a sync-lock is carried out at least at the local user device, but can optionally be extended to other user devices, for example to improve handling of file rename and move operations.

In one embodiment, the app1 118 may be coded to operate as a rudimentary file streaming server, possibly having a data provider 136 (both the merge handler 134 and the data provider 136 can be registered via the API 130 by the app1 118). The operating system 112 can provide a file placeholder system that allows a placeholder to be used in place of an actual file; to applications, a placeholder file looks like an ordinary file with file properties, openable/closeable, and so forth, but the data (content) for the file comes from a source other than the file system 110. In other words, a placeholder file is an operating system object that is presented as a file, but internally the data that appears to be within the file comes from a source other than the unit of file storage, e.g., from an application with a function or client that can stream data to the operating system. In this example, the data provider 136 of app1 118 118 streams its content (i.e., whatever it has done to the file 104 after the sync-lock was invoked) for the file 104 to the operating system and the streamed content is provided, via the file/operating system to anything reading the file 104 through the file system. Note that the placeholder/streaming function is not required for sync-locking.

While the sync-lock is held by the app1 118, the sync framework does not synchronize the file 104 at user devices or at the cloud 106. Thus, the app1 118 is free to implement its own synchronization logic or otherwise write to both the local instance and/or the cloud instance without concern for interference with the sync framework. For example, the app1 118 might inquire from the system whether the cloud copy and the local copy of the file 104 are identical, possibly using its own merge handler 134 or reconciliation logic. As discussed further below, the merge handler 134 of the app1 118 may be presented via an interface or contract to the sync engine 114 and can be called by the sync engine 114 to perform an application-provided merge; i.e., the sync framework can be extended with external sync functionality.

Eventually, app1 118 releases the sync-lock. This may be triggered explicitly by the application per its internal logic (e.g., a user of app1 explicitly closes the file 104). Or, a sync-lock release can be triggered automatically responsive to an event such as the app1 118 being closed or the app1 118 losing focus, being switched away by the user (user switches to another application), a system suspend occurring, etc.

When the sync-lock is released, the sync engine 114 resumes sync management of the file 104. If a placeholder mode is in use as described above, this might involve executing logic to resolve any outstanding placeholders. In addition, the sync engine 114 may attempt to sync the file 104, which in turn might trigger hydration of the file 104. The sync engine 114 may contact the data provider 136 or the merge handler 134, and app1 118 is activated to hydrate the file using the data provider 136. Subsequently, the sync engine 114 might check to see if an upload to the cloud 106 of the file 104 is pending. If not, then the sync framework is in a steady state with respect to the file 104. Even if there is no local update pending, the sync framework may have reason to download some more recent updates from the cloud if the cloud version changed. In that case (no pending local change but more recent cloud version) the cloud version replaces the local file (no conflict). However, if an upload is pending the cloud version may be downloaded (the sync engine does not have to download the cloud version to detect cloud changes, which can be reflected in other available information). If cloud changes are not detected then again the sync engine 114 is in a steady synchronizing state. Otherwise, the registered merge handler 134 of the app1 118 is invoked by the sync engine 114. If that fails, then some fail-handling procedure is triggered, such as forking (versioning) the file 104 or displaying a user interface to allow the user to choose how to resolve the inconsistency.

Figure 4:
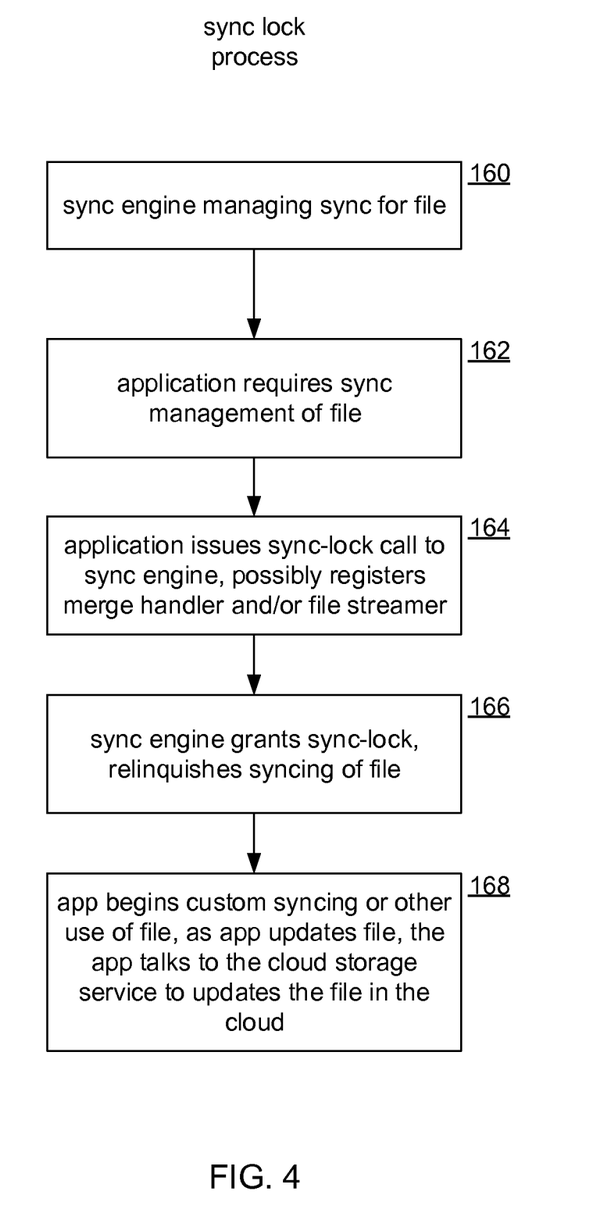
FIG. 4 shows a process.
Figure 5:
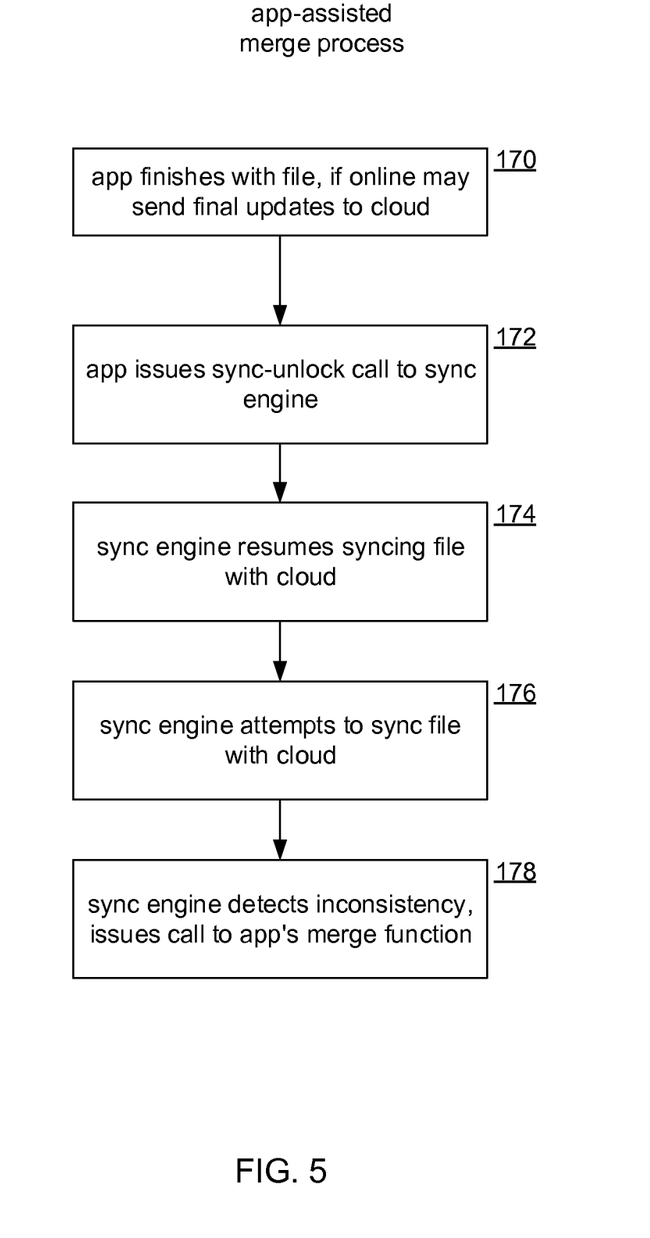
FIG. 5 shows another process.

Sequentially, referring to FIGS. 4, 5, and the time sequence shown in FIG. 3, initially, at step 160, the sync engine 114 is managing synchronization for the file 104. Writes to local and cloud instances by arbitrary applications via the file system and the cloud, respectively, are synchronized transparently to the applications. At step 162, an arbitrary application such as app1 118 may require execution of its own sync management for the file 104. At step 164 (first time 138) the application issues a sync-lock request to the sync engine 114 and optionally registers its merge handler 134 and/or its data provider 136 (per exchanges with the sync engine 114). At step 166 the sync engine grants the sync-lock request by relinquishing synchronization of the file with the cloud.

At step 168 the app1 118 has control of the file, writes to local and/or cloud instances of the file 104, updates, perhaps for custom synchronization, etc. Before a second time 140, a second application (app2) might request the file 104 via the file system, in which case the operating system supplies a placeholder file with content from the data provider 136. At second time 140, step 170 occurs, the app1 118 finishes with the file, and at step 172 issues a sync-unlock call to the sync engine 114. At step 174 the sync engine 114 resumes syncing the file with the cloud, which might involve a step 176 of attempting to sync the file, and possibly invoking the merge handler 134 at step 178. The particular order of steps in FIGS. 4 and 5 is not required and some steps may be omitted.

To summarize, an arbitrary application can provide sync related services or extensions to a sync framework, for example, that might otherwise not be available for the system or built-in sync framework. File coherency can be assured while the application is working with the file, behavior conflicts between the application and the sync framework can be avoided, and during a sync-lock other applications can access the file transparently via placeholders (the sync framework brokers access to the file contents). An all-or-nothing approach can be avoided by allowing the application to take full ownership of the files and apply custom synchronization logic. The application can negotiate with the sync framework to identify and acquire (sync-lock) these files. A contract, API, application-implementable software interface, or similar mechanism can be added to the built-in sync framework. The sync framework can act as the main agent of synchronization yet can be temporarily relieved of this duty by the application when the application is manipulating file. The application can indicate that it is able to perform smart merges over a given file. When the sync framework detects a sync conflict, it can then know that it can delegate the conflict resolution to the application.

Figure 6:
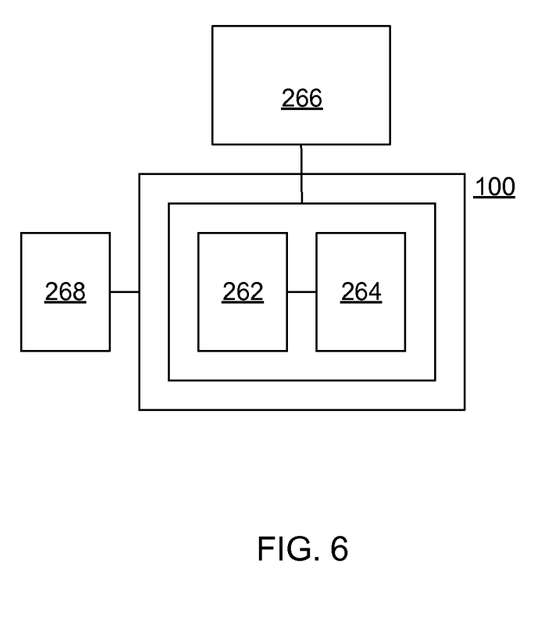
FIG. 6 shows an example computing device on which embodiments may be implemented.

FIG. 6 shows an example of computing device 100 on which embodiments described above may be implemented. The computing device 100 may have one or more displays 266, as well as a storage device 262 and a processor 264. These elements may cooperate in ways well understood in the art of computing. In addition, input devices 268 may be integrated with or in communication with the computing device 100. The display 266 may be any variety of devices used to display a signal outputted by computing devices, including, for example, solid-surface displays, projectors, touch-sensitive surfaces, and others. The computing device 100 may have any form factor or may be incorporated in another device. For example, touch-sensitive control panels are often used to control appliances, robots, and other machines. The computing device 100 may be in the form of a handheld device such as a smartphone, a tablet computer, a gaming box, a headless server, or others.

Embodiments discussed above and features discussed above can be realized in the form of information stored in volatile or non-volatile computer-readable or device-readable devices. This is deemed to include at least devices such as optical storage (e.g., compact-disk read-only memory (CD-ROM)), magnetic media, flash read-only memory (ROM), or any other devices for storing digital information in physical matter. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of providing application integration for a sync framework executing on a computing device that is storing a first instance of a file, the computing device in communication via a network with a cloud service, the cloud service storing a second instance of the file, the cloud comprising a remote sync engine, the method comprising:

during a period of time, allowing updates to the first instance of the file while allowing updates to the second instance;

for updates to the first instance and the second instance of the file during the period of time, automatically maintaining synchronization between the first instance of the file and the second instance of the file by exchanging, via a network, updates between the sync framework and the remote sync engine, the sync framework comprising an interface or API (application programming interface) to allow arbitrary applications executing on the computing device to communicate with the sync framework;

receiving a sync-lock request via the interface or API from a first application executing on the computing device, the sync-lock request being associated with the file; and responsive to the sync-lock request, providing a sync-lock comprising temporarily relinquishing synchronization between the first and second instance of the file by the sync framework, wherein while the sync-lock request is in effect, updating of the first and second instances of the file continues to be allowed.

2. A method according to claim 1, further comprising synchronizing the first and second instance of the file by the first application while the sync-lock is in effect.

3. A method according to claim 2, further comprising issuing a sync-lock release by the first application.

4. A method according to claim 3, further comprising responding to the sync-lock release by resuming the maintaining of the synchronization between the first and second instances of the file by the sync framework.

5. A method according to claim 4, wherein the resuming the maintaining of the synchronization comprises invoking, by the sync framework, a merge handler registered with the sync framework by the first application.

6. A method according to claim 5, further comprising merging the first and second instances of the file by the merge handler.

7. A method according to claim 5, further comprising saving a version of the file when then merge handler is unable to merge the first instance and the second instance of the file.

8. A computing device comprising:
a storage device configured to store files and manage cloud versions of the files;
a processor;
a sync engine, configured to synchronize the files with the respective cloud versions of the files such that changes to the respective cloud versions of the files synchronize to the files and changes to the files synchronize to the respective cloud versions of the files, and configured to exchange updates via a network with a remote sync engine of a storage service executing on a cloud, the storage service managing the cloud versions of the files, and configured to receive requests from an application executing on the computing device to sync-lock a first file of the files, wherein while a sync-lock of the first file is in effect, updating of the first file and a cloud version thereof continues to be allowed, and further configured to respond by stopping the automatic synchronizing for the first file for each of the sync-lock requests, and resuming the automatic synchronizing for the file when the application initiates corresponding releases of the sync-locks.

9. A computing device according to claim 8, wherein the applications modify the files through a file system.

10. A computing device according to claim 9, wherein the storage service is linked to the computing device with a user credential associated with the computing device.

11. A computing device according to claim 9, wherein another computing device also linked to the user credential updates the first file and the storage service storing the cloud version of the first file synchronizes to the first file at the computing device updates made by the other computing device to the cloud version of the first file.

12. A computing device according to claim 8, wherein when the application is issued a sync-lock the application is able to write to the first file at the computing device and is able to write to the cloud version of the first file without interference from the sync-engine.

13. A computing device according to claim 8, wherein when the sync-engine resumes the automatic synchronizing of the first file the sync engine downloads at least a portion of the cloud version of the first file and determines therefrom if there are differences between the first file and the cloud version of the first file.

14. A computing device according to claim 13, wherein when the sync engine determines that there are differences between the first file and the cloud version of the first file, the sync engine invokes the application, or an element registered thereby, to reconcile the first file and the cloud version of the first file.

15. A computing device according to claim 14, wherein the sync engine updates the cloud version of the first file according to the reconciling by the application or the element registered thereby.

16. A computer readable storage device storing information to enable a computing device to perform a process, the process comprising:

accessing a cloud storage service storing cloud instances of files stored by an operating system of the computing device, the cloud storage service comprising a remote sync engine;

while allowing updating of each of the files and while allowing updating of each of the respective cloud instances of the files, automatically synchronizing the cloud instances of the files with the local instances of the files, respectively, the synchronizing performed by an operating system of the computing device and the remote sync engine exchanging, via a network, updates to the files and the cloud instances of the files, the automatic synchronizing able to accommodate arbitrary applications on the computing device updating the local instances and arbitrary applications on the computing device or on other computing devices updating the cloud instances; and enabling the arbitrary applications to request and relinquish sync-locks to control suspension and resumption, by the operating system, of the automatic synchronizing of the files with the cloud instances of the files, wherein if an arbitrary application suspends automatic synchronization of a given file with a corresponding sync-lock request, updating the given file and a cloud instance thereof continues to be allowed.

17. A computer readable storage device according to claim 16, wherein an application specifies a local file for which synchronizing is to be suspended.

18. A computer readable storage device according to claim 17, wherein when the specified local file has synchronizing suspended the application provides data streaming of the local file to the operating system.

19. A computer readable storage device according to claim 18, wherein when a second application requests the local file while the synchronizing for the local file is suspended, the operating system obtains data for the local file from the data streaming and provides the data to the second application.

20. A computer readable storage device according to claim 19, wherein the second application requests the local file through a file system of the operating system, the file system managing the local instances of the files.

* * * * *